US012359503B2

(12) United States Patent
Tameshtit et al.

(10) Patent No.: US 12,359,503 B2
(45) Date of Patent: Jul. 15, 2025

(54) SOLAR WINDOW BLIND SYSTEMS (71) Applicant: MORGAN SOLAR INC., Toronto (CA)

(72) Inventors: Allan Tameshtit, Toronto (CA); John Paul Morgan, Toronto (CA)

( * ) Notice: Subject to any disclaimer, the term of this patent is extended or adjusted under 35 U.S.C. 154(b) by 0 days.

(21) Appl. No.: 18/725,292

(22) PCT Filed: Dec. 19, 2022

(86) PCT No.: PCT/IB2022/062502
§ 371 (c)(1),
(2) Date: Jun. 28, 2024

(87) PCT Pub. No.: WO2024/134249
PCT Pub. Date: Jun. 27, 2024

(65) Prior Publication Data
US 2024/0418035 A1  Dec. 19, 2024

(51) Int. Cl.
*E06B 9/32*  (2006.01)
*E06B 9/303*  (2006.01)
(Continued)

(52) U.S. Cl.
CPC .............. *E06B 9/322* (2013.01); *E06B 9/303* (2013.01); *H02S 20/30* (2014.12); *E06B 2009/247* (2013.01); *E06B 2009/2476* (2013.01)

(58) Field of Classification Search
CPC . E06B 9/32; E06B 9/322; E06B 9/303; E06B 2009/247; E06B 2009/2476; E06B 9/40; E06B 9/42; H02S 20/30
See application file for complete search history.

(56) References Cited

U.S. PATENT DOCUMENTS 4,951,730 A * 8/1990 Hsu .................. E06B 9/70
160/310
5,040,585 A * 8/1991 Hiraki ............... E06B 9/32
136/246
(Continued)

FOREIGN PATENT DOCUMENTS

WO  PCT/IB2017/054775  11/2018
WO  WO-2018211318 A1 * 11/2018 ......... H01L 31/0304
(Continued)

OTHER PUBLICATIONS

International Search Report from PCT/IB2022/062502, CIPO, Rajiv Agarwal, Aug. 18, 2023.
(Continued)

*Primary Examiner* — Johnnie A. Shablack (57) ABSTRACT

A solar window blind system located at a window of a room. The system includes a window blind; a motor operatively connected to the window blind; photovoltaic components disposed on the window blind; a rechargeable battery electrically connected to the photovoltaic components and charged therewith; and light sources electrically connected to the rechargeable battery. The light source is arranged to shine light into the room and/or an exterior of the window, the light sources being powered by the rechargeable battery when in use. A solar window blind system for a plurality of windows including a plurality of window blind assemblies configured to variably block light passing through a corresponding window and one or more rechargeable batteries electrically coupled to and charged by photovoltaic components of the window blind assemblies.

5 Claims, 9 Drawing Sheets

(51) Int. Cl.
  *E06B 9/322* (2006.01)
  *H02S 20/30* (2014.01)
  *E06B 9/24* (2006.01)

(56) References Cited

U.S. PATENT DOCUMENTS

| | | | | |
|---|---|---|---|---|
| 7,374,315 B2* | 5/2008 | Dorsey | ............... | F21V 33/006 362/800 |
| 7,617,857 B2* | 11/2009 | Froese | ............... | F21V 33/0016 362/253 |
| 8,104,921 B2* | 1/2012 | Hente | ............... | E06B 9/386 362/279 |
| 8,471,464 B2* | 6/2013 | Yamada | ............... | E06B 9/386 313/504 |
| 8,814,374 B2* | 8/2014 | Van Der Poel | ............... | E06B 9/32 362/276 |
| 8,820,970 B2* | 9/2014 | Nicole | ............... | H05B 47/10 362/279 |
| 9,328,906 B1* | 5/2016 | Bennington | ............... | F21V 23/04 |
| 9,371,983 B2* | 6/2016 | Engelen | ............... | F21V 5/02 |
| 10,458,179 B2* | 10/2019 | Hall | ............... | H02S 30/10 |
| 10,538,965 B1* | 1/2020 | Nguyen | ............... | F21V 33/006 |
| 10,746,358 B1* | 8/2020 | Palfreyman | ............... | F21S 2/005 |
| 11,226,089 B1* | 1/2022 | McRae | ............... | F21V 23/0435 |
| 12,051,759 B2 | 7/2024 | Barnes et al. | | |
| 2006/0152137 A1* | 7/2006 | Beteille | ............... | B32B 17/1077 313/503 |
| 2007/0175599 A1* | 8/2007 | Froese | ............... | F21S 9/037 160/10 |
| 2008/0041533 A1* | 2/2008 | Ziegler | ............... | E06B 9/386 160/10 |
| 2009/0059574 A1* | 3/2009 | Lewis | ............... | F21V 33/006 362/183 |
| 2010/0243025 A1* | 9/2010 | Bhatia | ............... | H01L 31/02021 136/244 |
| 2010/0302772 A1* | 12/2010 | Lin | ............... | G09F 23/06 362/249.02 |
| 2011/0007498 A1* | 1/2011 | Maier | ............... | F21S 9/037 362/183 |
| 2011/0126992 A1* | 6/2011 | Yordanova | ............... | H02S 20/30 160/405 |
| 2011/0253319 A1* | 10/2011 | Schaupp | ............... | E06B 9/42 362/253 |
| 2012/0152469 A1 | 6/2012 | Choi et al. | | |
| 2012/0299470 A1* | 11/2012 | Kobayashi | ............... | E06B 9/386 313/511 |
| 2013/0284234 A1* | 10/2013 | Funayama | ............... | H01L 31/048 136/251 |
| 2014/0027069 A1* | 1/2014 | Oppizzi | ............... | E06B 9/40 160/6 |
| 2014/0116497 A1* | 5/2014 | Sanders | ............... | H02S 40/32 136/246 |
| 2014/0202643 A1* | 7/2014 | Hikmet | ............... | B60J 1/2019 160/310 |
| 2014/0369033 A1* | 12/2014 | Palfreyman | ............... | F21V 21/005 362/183 |
| 2016/0002974 A1* | 1/2016 | Boyle | ............... | E06B 9/386 160/173 R |
| 2019/0048656 A1* | 2/2019 | Combee | ............... | E06B 9/38 |
| 2020/0080369 A1* | 3/2020 | Achiel | ............... | E06B 9/32 |
| 2020/0185557 A1 | 6/2020 | Morgan et al. | | |
| 2022/0336688 A1 | 10/2022 | Barnes et al. | | |
| 2023/0155538 A1 | 5/2023 | Molinero | | |
| 2024/0387761 A1 | 11/2024 | Barnes et al. | | |
| 2024/0401404 A1 | 12/2024 | Ling et al. | | |

FOREIGN PATENT DOCUMENTS

| | | |
|---|---|---|
| WO | WO2023000092 A1 | 1/2023 |
| WO | WO2023042125 A1 | 3/2023 |
| WO | PCT/IB2023/058822 | 3/2024 |
| WO | WO-2024052832 A1 * | 3/2024 |
| WO | WO2025081268 | 4/2025 |

OTHER PUBLICATIONS

ARTEMIS: Smart Zip Track with RGBIC Lighting https://www.youtube.com/watch?v=o_x71PijyVM.

Written Opinion of the ISA; International Appln. No. PCT/IB2022/062502; Applicant: Morgan Solar, Inc.; Date of Completion of Opinion: Aug. 8, 2023.

Canadian Examiner Requisition including Examination Search Report; Jan. 5, 2024; Canadian Application No. 3,217,693.

CEDIA Expo 22: Hunter Douglas Intros Aura Illuminated Shades Three-in-One Solution https://www.youtube.com/watch?v=UwDOEF65rP4.

Lumiduct by Wellsun https://www.wellsun.nl/lumiduct Time stamp of internal file containing reference: Jun. 9, 2023.

Written Opinion of the ISA; International Appln. No. PCT/CA2024/051365; Applicant: Morgan Solar, Inc.; Date of Mailing: Jan. 22, 2025.

* cited by examiner

SOLAR WINDOW BLIND SYSTEMS

TECHNICAL FIELD

The present technology relates generally to window blind systems, particularly to solar window blind systems.

BACKGROUND

Window blind systems are commonly installed to manage sunlight entering a home or business through windows, as well as to limit the ability to see inside the home or business from an exterior thereof.

By blocking sunlight from entering a home or business using a window blind, solar heating of the building can be reduced thereby reducing cooling costs and energy use. The solar energy reflected away by the window blinds is lost, however, even though there may be a desire to illuminate the building at another moment.

There remains a desire to develop window blind systems for managing light transmitted through a window.

SUMMARY

It is an object of the present technology to ameliorate at least some of the inconveniences present in the prior art.

According to one aspect of the present technology, there is provided a solar window blind system located at a window of a room. The system includes a window blind; at least one motor operatively connected to the window blind for moving the window blind; at least one photovoltaic component disposed on the window blind; a rechargeable battery electrically connected to the at least one photovoltaic component and charged therewith; and at least one light source electrically connected to the rechargeable battery, the at least one light source being arranged to shine light into at least one of the room and an exterior of the window, the at least one light source being powered by the rechargeable battery when in use.

In some embodiments, the system further includes a microcontroller operatively connected to the at least one motor.

In some embodiments, the window blind includes at least one light blocking assembly capable of assuming a deployed configuration and a retracted configuration; the at least one light blocking assembly is arranged to block external light from entering the room when in the deployed configuration; the at least one light blocking assembly is arranged to allow external light to enter the room when in the retracted configuration; and the at least one light source is disposed on the at least one light blocking assembly.

In some embodiments, the at least one light blocking assembly includes a rollable shade.

In some embodiments, the at least one photovoltaic component is disposed on a window-facing side of the rollable shade.

In some embodiments, the at least one light blocking assembly includes a plurality of rotatable slats.

In some embodiments, the at least one photovoltaic component is disposed on at least one of the plurality of rotatable slats.

According to another aspect of the present technology, there is provided a solar window blind system for a plurality of windows. The system includes a plurality of window blind assemblies, each window blind assembly being configured to variably block light passing through a corresponding one of the plurality of windows, and each window blind assembly including: a light blocking assembly, a motor operatively connected to the light blocking assembly for moving the light blocking assembly, and at least one light source; at least one photovoltaic component residing at at least one window blind assembly of the plurality of window blind assemblies; and at least one rechargeable battery electrically coupled to and charged by the at least one photovoltaic component, wherein the at least one rechargeable battery is electrically connected to and capable of powering the at least one light source of each of the plurality of window blind assemblies.

In some embodiments, each window blind assembly of the plurality of window blind assemblies further includes a microcontroller for controlling the motor.

In some embodiments, for each window blind assembly: the light blocking assembly is capable of assuming a deployed configuration and a retracted configuration; the light blocking assembly blocks external light from entering the room when in the deployed configuration; allows external light to enter the room when in the retracted configuration; and the at least one light source is disposed on the at least one light blocking assembly.

According to yet another aspect of the present technology, there is provided a motor-operated window blind system powered by solar energy. The system includes a window blind disposed near a window having transparent photovoltaic material; a motor for operating the window blind, the motor being operatively connected to the window blind; at least one light source disposed on the window blind; and a battery for powering the at least one light source, said battery being electrically connected to the transparent photovoltaic material of the window, wherein the photovoltaic material is utilized to charge said battery.

In some embodiments, the system further includes a microcontroller for controlling the motor and operatively connected to the motor.

In some embodiments, the motor is electrically connected to the battery, the battery capable of powering the motor when in use.

In some embodiments, the window blind includes at least one light blocking assembly capable of assuming a deployed configuration to block external light entering a room with the window, and a retracted configuration to allow external light to enter the room, and the at least one light source is disposed on the at least one light blocking assembly.

In some embodiments, the motor is electrically connected to the transparent photovoltaic material, the motor being powered by utilizing the transparent photovoltaic material when in use.

In some embodiments, the window blind system further includes the window.

In some embodiments, the at least one light blocking assembly includes a plurality of rotatable slats.

Embodiments of the present technology each have at least one of the above-mentioned objects and/or aspects, but do not necessarily have all of them. It should be understood that some aspects of the present technology that may have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

Embodiments will now be described more fully with reference to the accompanying drawings in which.

Unless otherwise indicated, it should be noted that the Figures may not be drawn to scale.

DETAILED DESCRIPTION

For a better understanding of various features of the present technology, reference is made to the following description and the accompanying Figures. A person skilled in the art would understand that modifications to the embodiments described below are possible and may be necessary for specific applications.

As used herein, a window blind can include shutters and shades. Several window blinds are known in the art such as a rollable shade, which can be rolled down to block external light entering a window and rolled back up to allow the light to enter. Another type of window blind is a Venetian blind (including mini and micro blinds) having horizontal slats. The slats typically sit on a ladder cord and can be rotated in unison to vary the amount of external light that enters the room. The slats can also be raised and stacked close together near the top of the window blind. Other types of blinds include vertical blinds, panel blinds, pleated shades, honeycomb shades, Roman shades and curtain blinds.

Blinds can be manufactured from various materials, including wood (real or faux), plastic, metal, paper and fabric (natural or synthetic). Characteristic of a blind is that it includes a light blocking assembly capable of assuming a deployed configuration and a retracted configuration, further discussed below. The light blocking assembly blocks external light from entering the room when in the deployed configuration and allows external light to enter the room when in the retracted configuration.

For example, in a Venetian blind, in the deployed configuration, the slats of a Venetian blind can be rotated in unison to vary the amount of external light that is blocked. The slats can also be raised into a retracted configuration to allow light to enter. Typically, in a retracted configuration, the slats of a Venetian blind are all stacked close together near the top of the window blind.

In a rollable shade, the light blocking assembly includes the rollable cover (often made of fabric material) that can be rolled down in the deployed configuration or rolled up in the retracted configuration.

Figure 1:
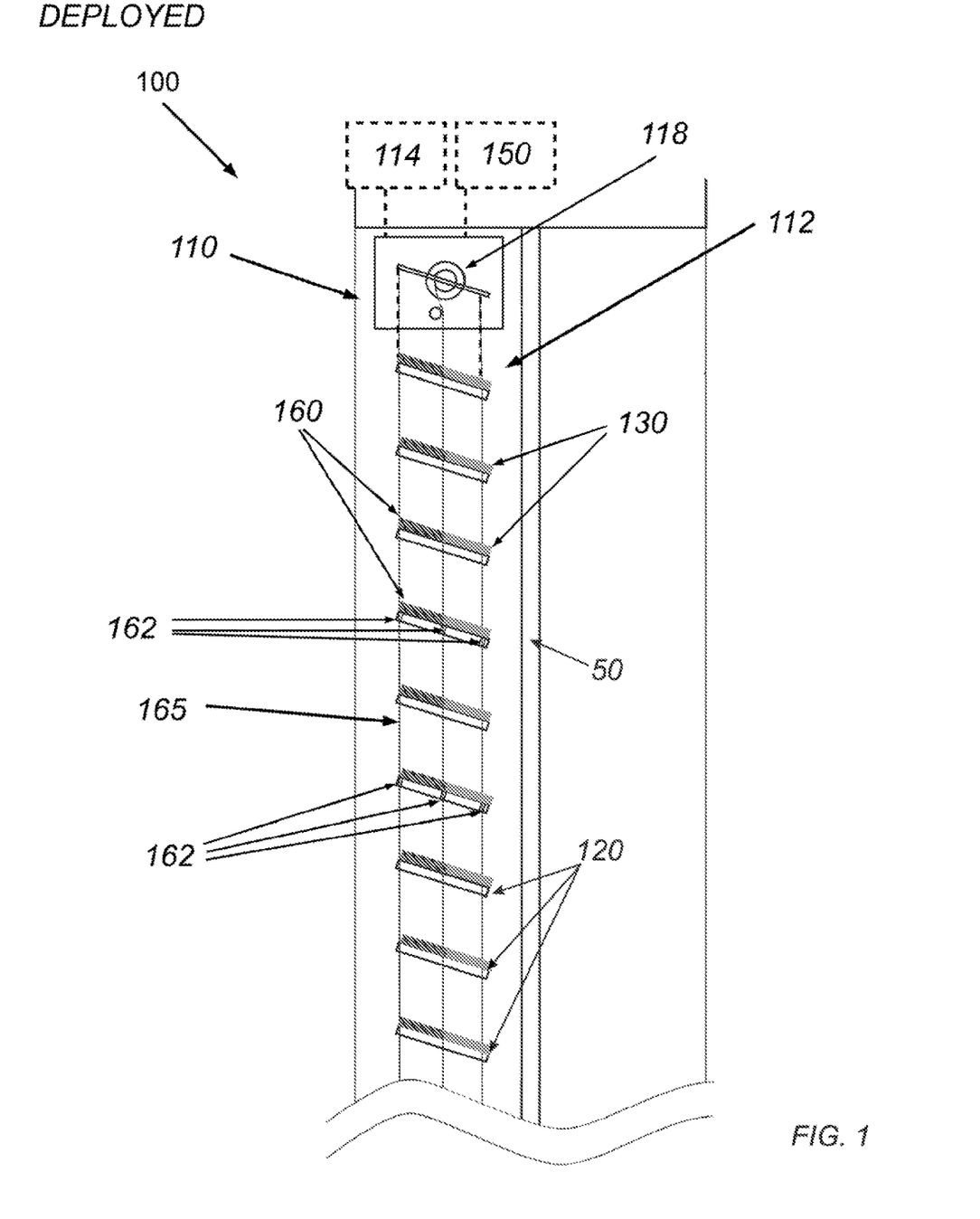
FIG. 1 is a schematic, side view illustration of a solar window blind system according to an embodiment of the present technology as located in a window, with the system being in a deployed configuration.
Figure 2:
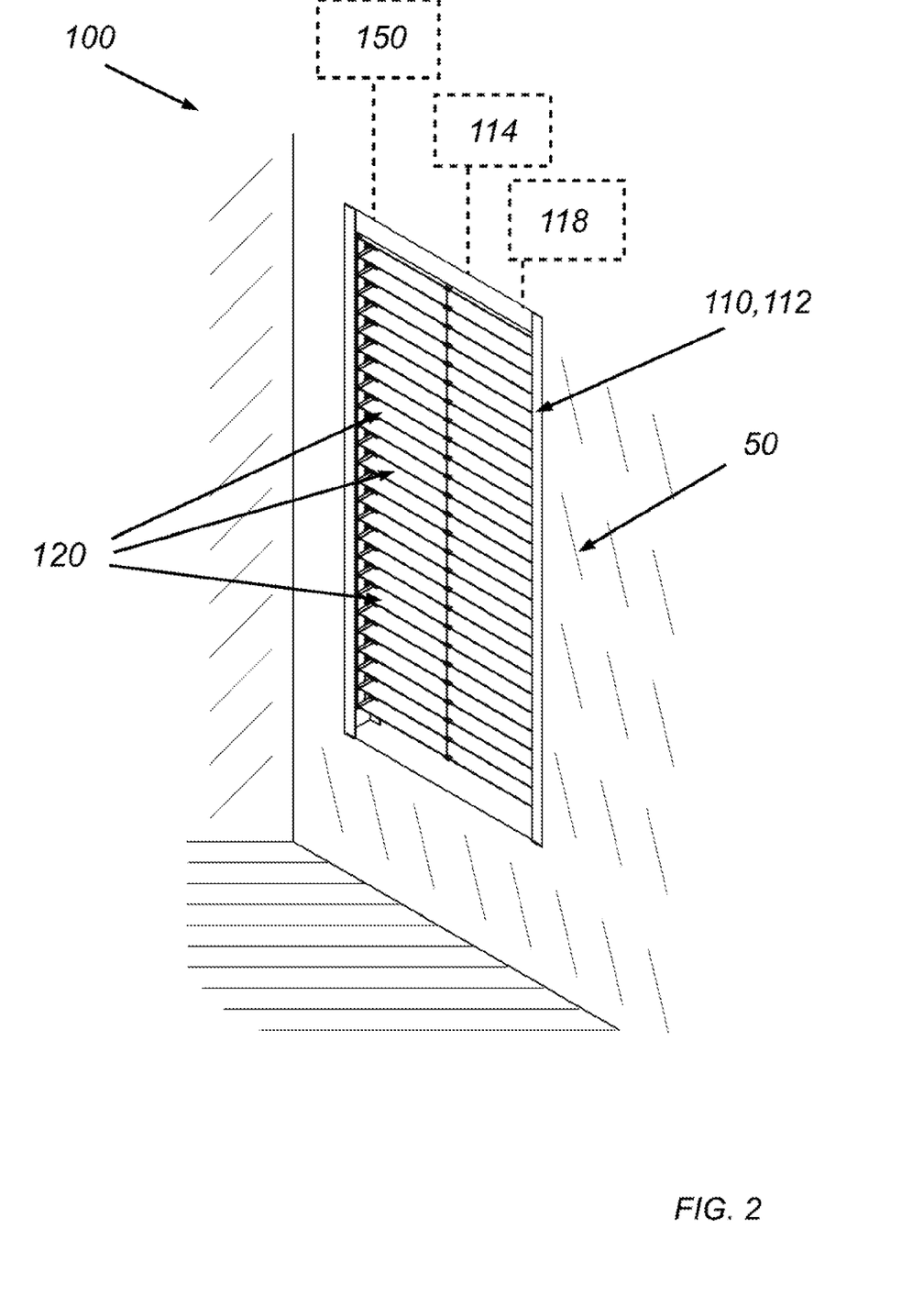
FIG. 2 is a perspective view illustration of the solar window blind system and window of FIG. 1, as located in a room of a building.
Figure 3:
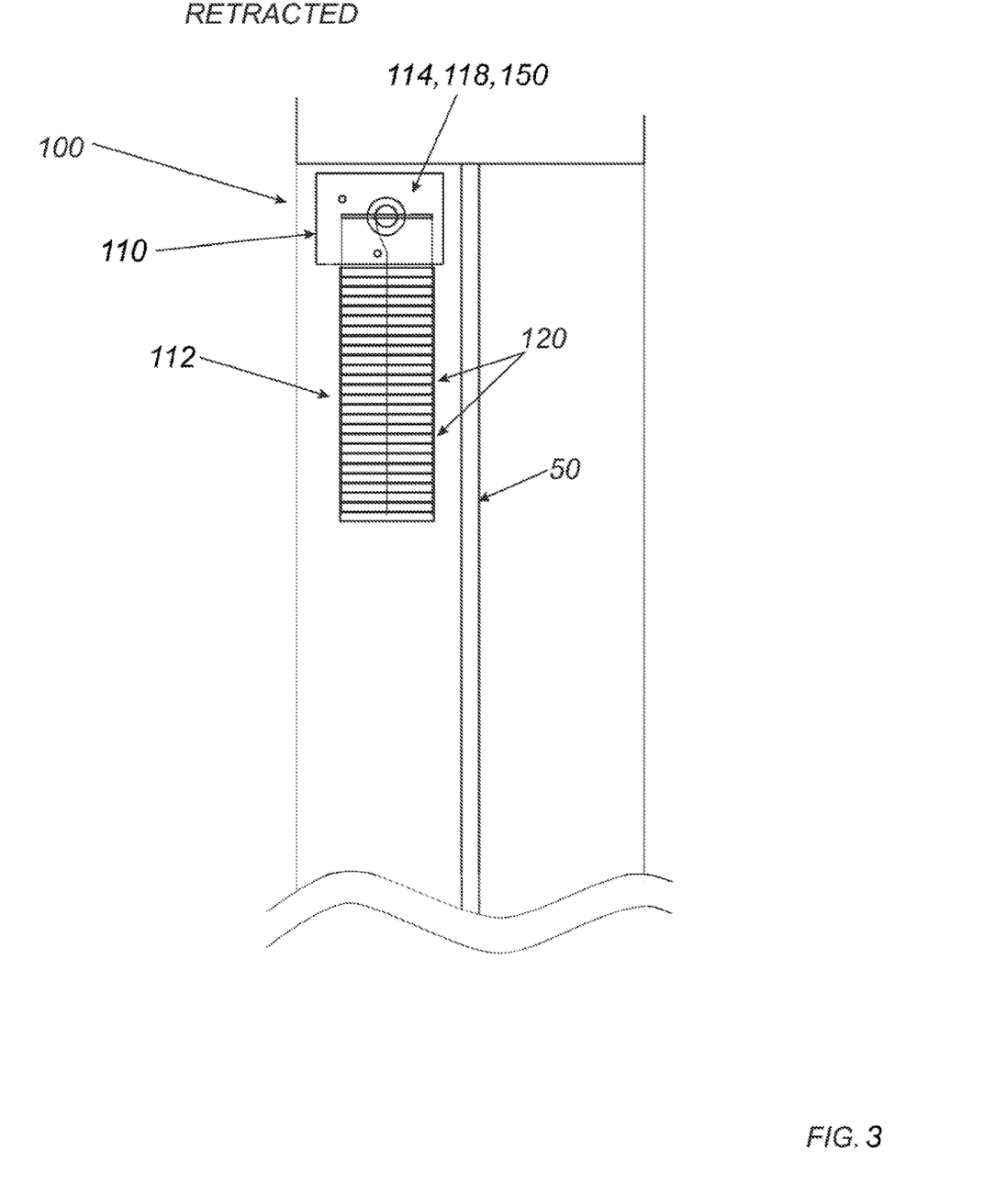
FIG. 3 is a schematic, side view illustration of the solar window blind system of FIG. 1, with the system being in a retracted configuration.

With reference to FIGS. 1 to 3, one non-limiting embodiment of a solar window blind system 100, also referred to herein as the system 100, is described. The system 100 is configured to be located at a window 50 of a room. The blind system 200 can be located on either side of the window 50, but preferably located on the room-side of the window 50.

The system 100 includes a window blind 110. When in use, the window blind 110 is arranged and configured to selectively block at least some light transmission from outside of the window 50 to an interior side of a structure in which the window 50 is installed.

The window blind 110 includes a light blocking assembly 112 capable of assuming a deployed configuration and a retracted configuration, along with components (not separately identified) for managing moving between these configurations. When in the deployed configuration (FIG. 1), the light blocking assembly 112 is generally arranged to block external light from entering the room via the window 50. When in the retracted configuration (FIG. 3), the light blocking assembly 112 is arranged to allow external light to enter the room via the window 50.

In the present embodiment, the light blocking assembly 112 includes a plurality of rotatable slats 120. In this embodiment, the slats 120 are generally planar, flat slats, although different forms are contemplated. As can be seen in FIG. 1, in the deployed position, the slats 120 are rotatable between a position that allows some external light to transmit between the slats 120 and a position where the slats 120 are generally vertically arranged and overlapping, in order to block external light from entering the room. In some other embodiments of a light blocking assembly, it is contemplated that the assembly could block all light when in the deployed configuration.

In the present embodiment, a ladder cord 165 is used to control positioning of the slats 120, specifically a right side ladder cord 165 and a left side ladder cord (not shown). Each slat 120 has defined therein at least one hole near one end of the slat 120 and at least one hole near an opposite end of the slat 120. Specifically, each slat 120 has three holes 162 defined therein in each end (one set of holes 162 being illustrated schematically in FIG. 1). The ladder cords 165 are threaded through the holes 162. The slats 120 are thus rotatable via the ladder cords 165.

In order to move the window blind 110, and the light blocking assembly 112 thereof, the system 100 also includes a motor 118 operatively connected to the window blind 110. The motor 118 is configured to selectively move the window blind 110 between at least the retracted position and the deployed position. In at least some embodiments, the motor 118 could be further configured to move the window blind 110 to one or more positions intermediate the retracted position and the deployed position. In at least some embodiments, the retracted position may not fully expose the window 50, with some portions of the window blind 110 still obscuring a portion of the window 50.

The system 100 further includes a microcontroller 114 operatively connected to the motor 118 for controlling the motor 118 and for selectively causing the motor 118 to move the window blind 110. The microcontroller 114 includes a compact integrated circuit (not shown) designed to govern certain movements of the window blind 110. Components of a microcontroller 114 typically include a processor, memory and input/output (I/O) peripherals on a single chip, or less often several chips. The microcontroller 114 could be controlled with, for example, voice commands, smart phones or buttons.

According to the present technology, the system 100 further includes one or more photovoltaic components 130 disposed on the window blind 110. The photovoltaic components 130 are arranged and configured to receive solar light via the window 50, producing electrical energy therefrom. In the present embodiment, there is one photovoltaic component 130 disposed on each of the rotatable slats 120. Specifically, each slat 120 has one laterally extending photovoltaic cell 130 along one side of the slat 120. In different embodiments, the number and arrangement of the photovoltaic components 130 could vary. For instance, some of the slats 120 could be provided without the photovoltaic components 130. Examples of photovoltaic materials that could be used include silicon based materials, such as monocrystalline silicon, polycrystalline silicon and thin film silicon photovoltaics, and gallium based ones. Other possible examples include newer materials such as 4GEN, also known as "inorganics-in-organics," combining polymer thin films with inorganic nanostructures (i.e., metal nanoparticles and metal oxides) with organic-based nanomaterials (i.e., carbon nanotubes, graphene and its derivatives). In some embodiments, instead of attaching photovoltaic components 130 to the slats 120, the slats 120 themselves can be composed of photovoltaic material.

Electrochromic (i.e., tintable) and transparent photovoltaic material can also be used. If the slats 120 themselves are composed of such material, this affords the possibility of using the blind system 100 in the deployed configuration to at the same time allow the external scenery to be visible from indoors and light to be shone into the room from light source (described below) on the slats 120. As used herein, the word transparent in the phrase "transparent photovoltaic material" is understood to mean substantially transparent, not completely transparent. It is noted that a completely transparent photovoltaic material is a misnomer since such material would not absorb any photons and therefore could not be photovoltaic. For example, some commercially available photovoltaic "glass" can allow less than 70% of incoming light to pass through.

The system 100 further includes a rechargeable battery 150 electrically connected to the photovoltaic components 130. The battery 150 receives electrical energy generated by the photovoltaic components 130 and charged thereby. In addition to the functions described below, it is contemplated that in some embodiments, the battery 150 could be operatively connected to the motor 118 in order to supply power thereto. The motor 118 could be alternatively or additionally connected to an external electrical source (e.g. plugged into an outlet of the room).

The system 100 further includes one or more light sources 160 electrically connected to the rechargeable battery 150. The light sources 160 are powered by the rechargeable battery when in use. In some embodiments, an additional electrical power source could be used, for example when the battery 150 charge has been depleted.

In the present embodiment, the light sources 160 are connected to the slats 120, with specifically one light source 160 being connected to a corresponding slat 120. The light sources 160 are LED strips 160 in the present case. LED strip color options include pink, UV (blacklight), blue, green, yellow, amber, red, and orange. Single-color LED strip lights may also be used in cool, natural, and warm white. These strips are capable of different color modes and intensities. It is also contemplated that LIFX tiles or beams may be used. Other appropriate light producing components besides LED strips may be used. The light sources 160 are arranged to shine light either into the room or outward to an exterior of the building via the window 50, or selectively both. By rotating of the slats 120, by the motor 118, such that the light sources 160 are oriented toward the window 50 (clockwise rotation as illustrated in FIG. 1), the light sources 160 can shine light out through the window 50. By rotating of the slats 120 such that the light sources 160 are oriented away from the window 50 (counterclockwise rotation as illustrated in FIG. 1), the light sources 160 can illuminate the room. It is contemplated that some embodiments may not permit a change of configuration providing illumination outward through the window 50, described further below.

Figure 4:
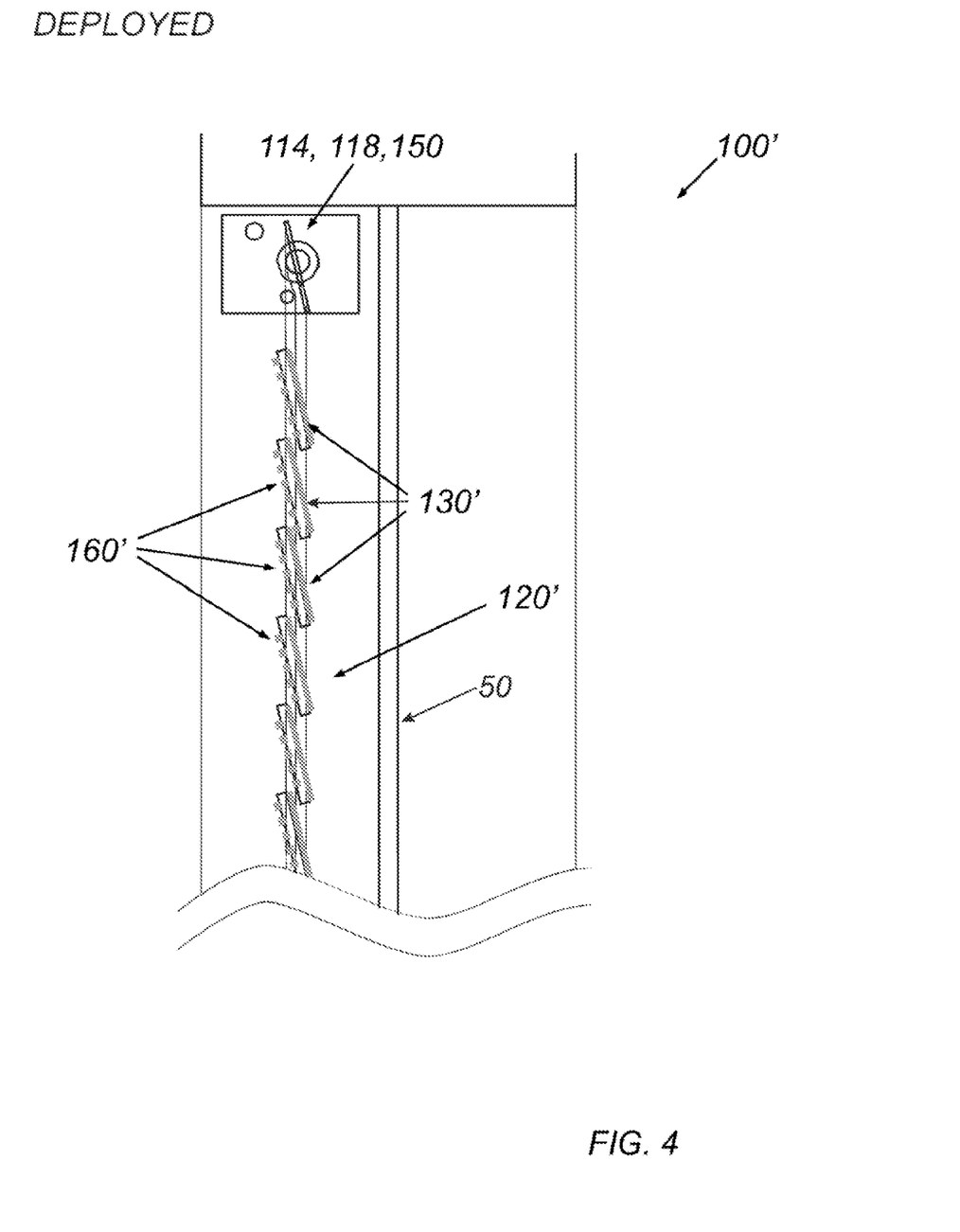
FIG. 4 is a schematic, side view illustration of a solar window blind system according to another embodiment of the present technology, with the system being in a deployed configuration.

While the light sources 160 and the photovoltaic components 130 are disposed on a same side of the slats 120, it is also contemplated that these components could be disposed on opposite sides of the slats. As is illustrated in FIG. 4, another embodiment of the system 100' has a photovoltaic component 130' disposed on one side of the slat 120' and a light source 160' disposed on the opposite side of the slat 120'. In at least some other embodiments, LED strips could be applied to every other slat, either with or without photovoltaic components. Yet other arrangements of light sources and photovoltaic components are contemplated, such as a top portion of the slats of a given blind having LED strips while a bottom portion of the slats have photovoltaic components, or vice versa.

Figure 5:
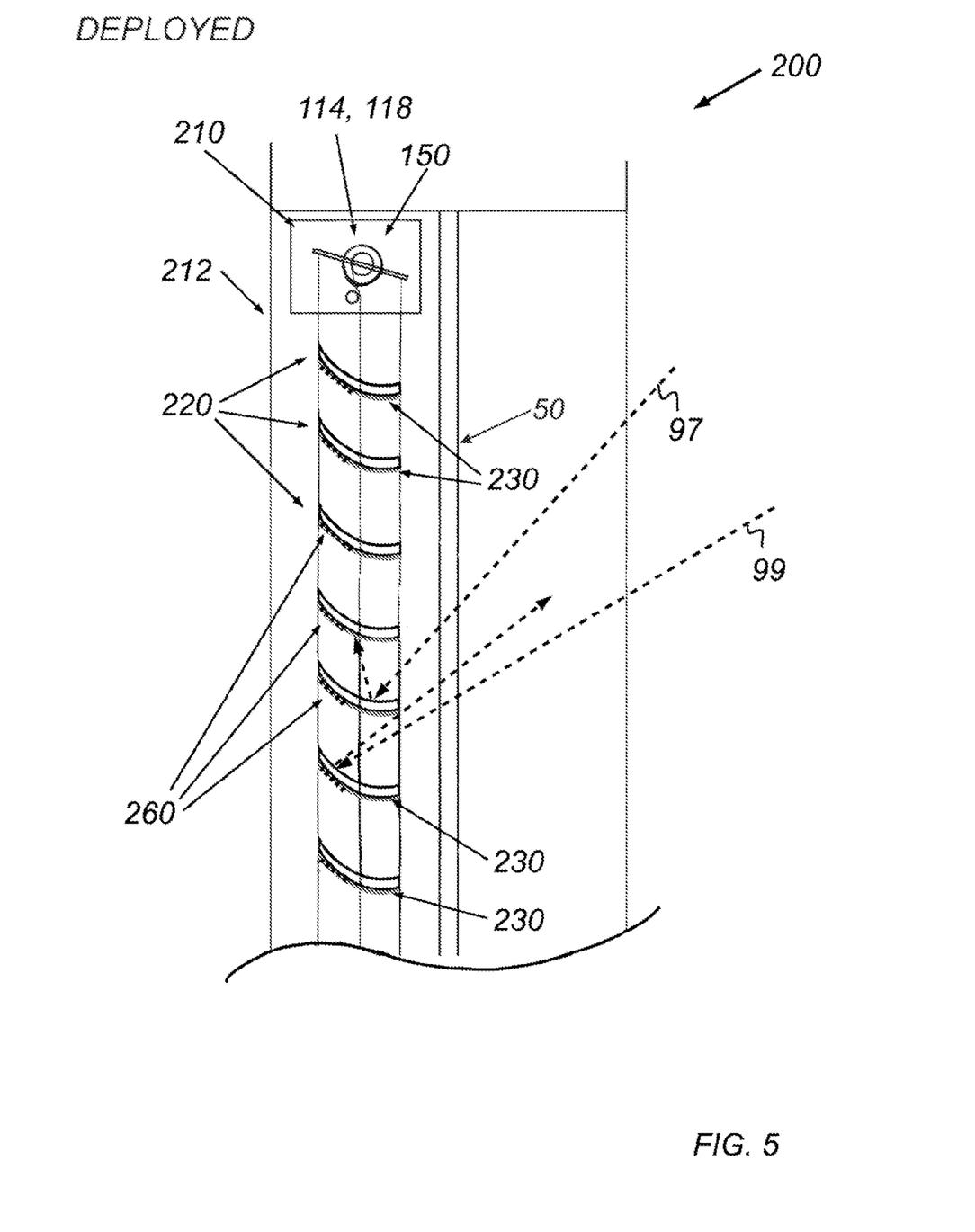
FIG. 5 is a schematic, side view illustration of a solar window blind system according to yet another embodiment of the present technology, with the system being in a deployed configuration.

Another embodiment of a solar window blind system 200 according to the present technology is illustrated in FIG. 5. Elements of the system 200 that are similar to those of the system 100 retain the same reference numeral and will generally not be described again.

The system 200 includes a window blind 210, arranged and configured to selectively block at least some light transmission from outside of the window 50 to an interior side of a structure in which the window 50 is installed.

The window blind 210 includes a light blocking assembly 212 capable of assuming a deployed configuration and a retracted configuration, along with components (not separately identified) for managing moving between these configurations. The window blind 210 is operatively connected to the motor 118 for moving between the deployed and retracted configuration, as well as intermediate configurations.

In the present embodiment, the light blocking assembly 112 includes a plurality of rotatable slats 220. Specifically, the slats 220 are Venetian blind slats 220, which are curved. In the illustrated embodiment, the slats 220 are curved according to a circular section form, but different curves are contemplated.

The system 200 includes a plurality of photovoltaic components 230 disposed on the window blind 210. The photovoltaic components 130 are arranged and configured to receive solar light via the window 50, producing electrical energy therefrom. In the present embodiment, there is one photovoltaic component 230 disposed on each of the rotatable slats 220. Specifically, each slat 220 has one laterally extending photovoltaic cell 230 along one side of the slat 120. In different embodiments, the number and arrangement of the photovoltaic components 230 could vary. For instance, some of the slats 220 could be provided without the photovoltaic components 230.

The system 200 further includes light sources 260 electrically connected to the rechargeable battery 150. The light sources 260 are LED strips 260, powered by the rechargeable battery when in use. In some embodiments, an additional electrical power source could be used, for example when the battery 150 charge has been depleted. Other appropriate light sources besides LED lights may also be used.

As is noted above, photovoltaic material and/or photovoltaic components could be disposed on various parts of the window blind system, depending on the particular embodiment. As is illustrated in the embodiment of FIG. 5, photovoltaic material is disposed on a convex surface of the slats 220, also referred to as a "back" side of the slats 220, according to a common arrangement of the slats 220 relative to the window 50. The back of the curved slats 220 thus contains the photovoltaic material forming the components 230.

Depending on the angle and position of external light incident of an at least partially reflective concave side (similarly referred to as a "front" side, the "rear side" being generally convex), some light may be reflected to the back of a neighboring slat 220 to be incident on the photovoltaic material component 230, as is illustrated by example ray 97. According to some angles and positions of incidence, some light may be reflected back out through the window 50, as is illustrated by example ray 99. The specific one of the two paths the light takes depends on the incident angle, i.e., the angle at which light strikes the reflective surface. Even when all the external light rays approaching the window blind are parallel, the angle of incidence of the light rays when they strike the reflective surface will vary due to the curvature of the slats. Some rays will travel back out the window, and other rays will reflect and strike a photovoltaic component 230. It is noted that the angle and position of incidence of rays on the slats 220 depends on the specific curvature of each slats 220, as well as an angle of rotation of the slats 220 relative to the window and an angle of the sun relative to the window and the blind system 200. This configuration allows both heat management, by reflecting light away from the room, and energy production from solar light striking the photovoltaic components 230.

Figure 6:
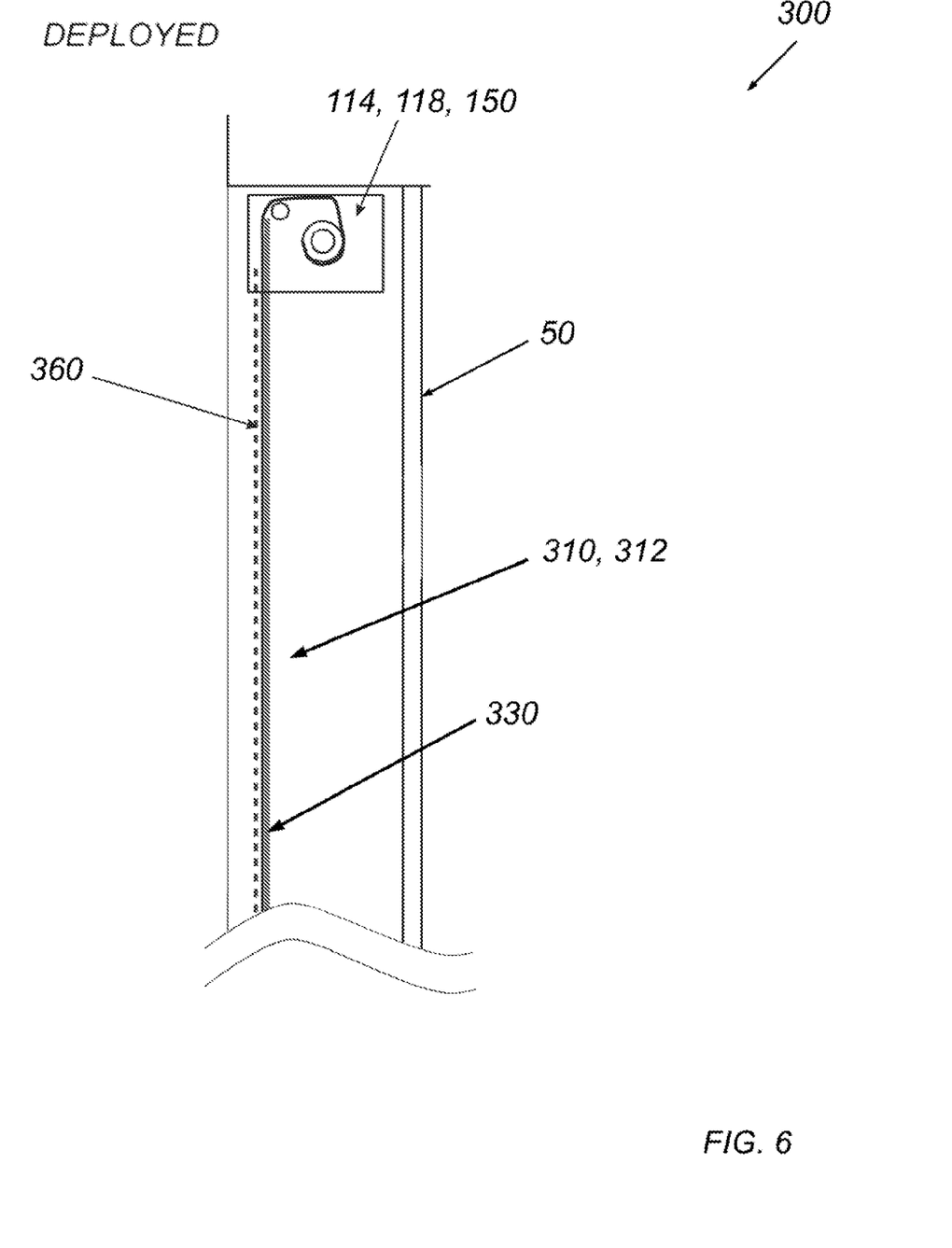
FIG. 6 is a schematic, side view illustration of a solar window blind system as located in a window according to yet another embodiment of the present technology, with the system being in a deployed configuration.
Figure 7:
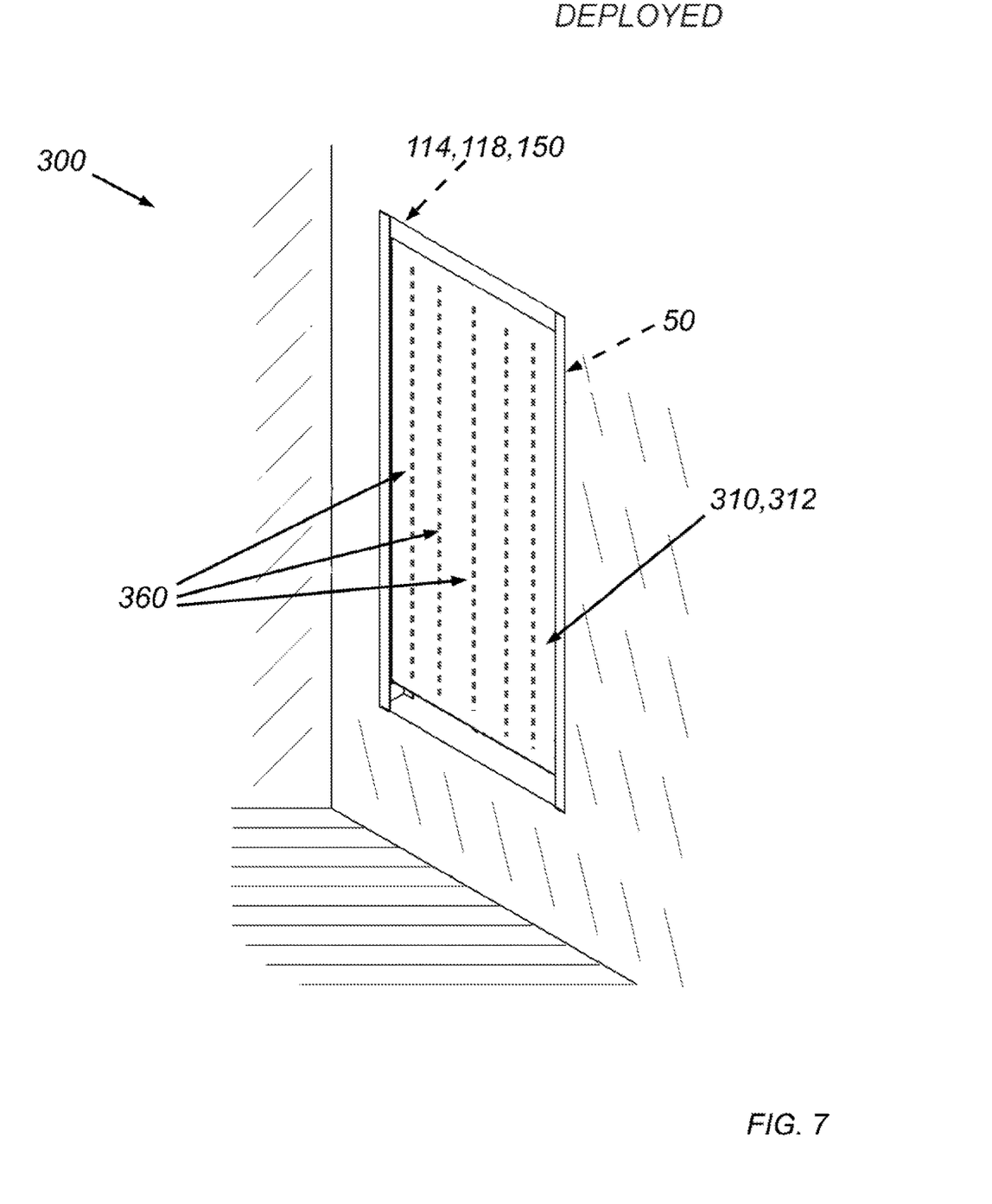
FIG. 7 is a perspective view illustration of the solar window blind system and window of FIG. 7, as located in a room of a building.

Yet another embodiment of a solar window blind system 300 according to the present technology is illustrated in FIGS. 6 and 7. Elements of the system 300 that are similar to those of the system 100 retain the same reference numeral and will generally not be described again.

The solar window blind system 300 includes a light blocking assembly 310, which specifically includes a rollable shade 312. The rollable shade 312 is capable of being rolled up and down by the motor 118, between a deployed configuration and a retracted configuration. The rollable shade 312 is generally made from a fabric material, although different materials are contemplated.

The system 300 includes a photovoltaic component 330, specifically a photovoltaic sheet 330, disposed on a window-facing side of the rollable shade 312. For this purpose, flexible, thin-film solar material, which is commercially available, can be used as the sheet. This sheet can be attached to a fabric cover with adhesive, or other appropriate hardware such as thread, rivets, etc. Alternatively, the shade or cover itself can be composed of the photovoltaic material, obviating the need for a separate cover.

The photovoltaic sheet 330 is electrically connected to the rechargeable battery 150 for charging thereby, similarly to the system 100. It is noted that the rollable shade 312 needs to be at least partially deployed in order for light to be converted into electrical energy by the system 300.

The system 300 also includes light sources 360 disposed on the rollable cover 312 of the assembly 310. In the present embodiment, the light sources 360 are a series of LED strips 360. While six, vertically extending LED strips 360 are illustrated, it is contemplated that more or fewer LED strips 360 could be included. It is also contemplated that different arrangements of the LED strips 360 and photovoltaic material could be used, for example with various orientations and spacing. For example, the LED strips 360 could be arranged in horizontal rows, instead of the vertical columns shown in the figure, which might facilitate the rolling up of the shade. The LED strips 360 are disposed on a side of the rollable shade 312 opposite the window 50 and the photovoltaic component 330, such that when in use, the LED strips 360 can be used to light the room when the rollable shade 312 is in the deployed configuration. Alternatively, in some embodiments, the LED strips 360 could be disposed on the same side of the rollable shade 312 as the photovoltaic sheet 330, in order to provide lights to be seen or used on an exterior of the window 50.

Figure 8:
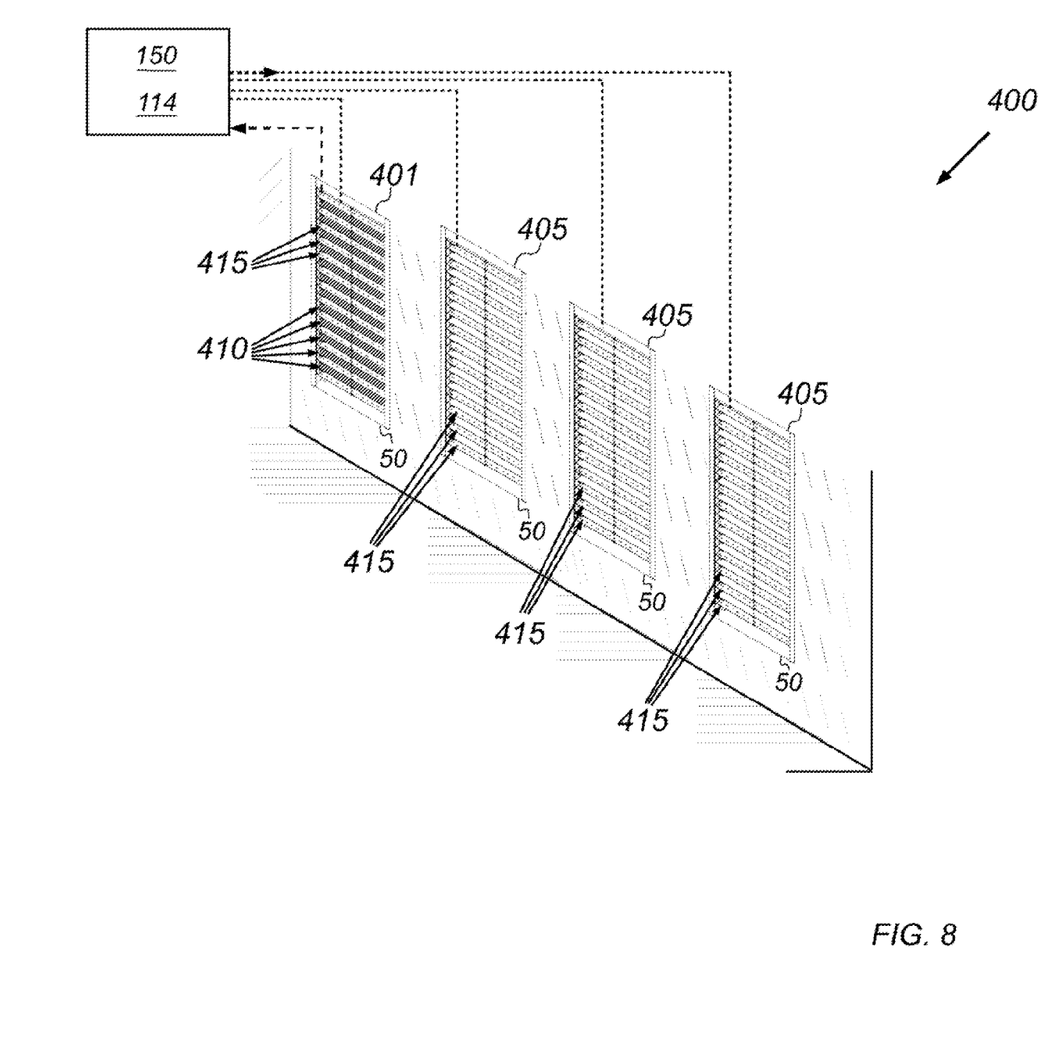
FIG. 8 is a is a perspective view illustration of a solar window blind system and a plurality of windows, illustrated in a room of a building.

With reference to FIG. 8, a solar window blind system 400 for a plurality of windows is illustrated. Elements of the system 400 that are similar to those of the system 100 retain the same reference numeral and will generally not be described again.

Recognizing that some windows of a given building are exposed to more sunlight than others, including because of the physical cardinal (N-S-E-W) orientation of a given window or because of an adjacent building blocking the sun, the solar window blind system 400 includes a plurality of window blinds 401, 405 disposed on different windows, each with lights thereon. The window blinds 401, 405 are electrically connected to each other such that a battery associated with one window blind is arranged to power the lights of one or more of the window blinds 401, 405 of the system 400.

According to non-limiting embodiments of the present technology, the solar window blind system 400 includes a plurality of window blind assemblies 401, 405. Each window blind assembly 401, 405 is configured to variably block light passing through a corresponding one of the plurality of windows 50. The system 400 also includes the microcontroller 114 and the rechargeable battery 150, as described above with respect to the window blind system 100. In some embodiments, each window blind assembly 401, 405 could additionally or alternatively include a separate microcontroller 114. It is also contemplated that the system 400 could include more than one battery 150.

Each window blind assembly 401, 405 includes a light blocking assembly, including slats, and a motor operatively connected to the light blocking assembly for moving the light blocking assembly (not individually labeled). Each window blind assembly 401, 405 includes one or more light sources 415, specifically LED strips 415 disposed on some of the slats of each window blind assembly 401, 405. The light sources 415 of the assemblies 401, 405 are electrically connected to the battery 150 for powering thereby.

The system 400 further includes at least one photovoltaic component 410 residing at one or more of the window blind assemblies. In the illustrated embodiment, the window blind assembly 401 includes photovoltaic cells 410 disposed on some of the slats. The photovoltaic cells 410 are electrically connected to the battery 150, such that electrical energy generated by the photovoltaic cells 410 charges the battery 150 when the system 400 is in use. The window blind assemblies 405 do not, in contrast, contain any photovoltaic complements in the present non-limiting example.

The rechargeable battery 150 is electrically coupled to and charged by the photovoltaic cells 410, such that the rechargeable battery 150, electrically connected to the LED strips 415, is capable of powering the light sources 415 of each window blind assembly 401, 405.

While the system 400 is illustrated with only one window 50 having the window blind 401 having the photovoltaic cells 410, it is contemplated that additional windows connected to an otherwise embodiment of the system 400 could be provided with a window blind having the photovoltaic cells 410. It is also contemplated that the window blind assembly 401, provided with the photovoltaic cells 410, may omit the LED strips 415 in some embodiments.

In such an embodiment, if the photovoltaic elements of one window blind do not receive enough sunlight to charge the battery, the battery of a second window blind, perhaps disposed at a different window, could power the lights of the first window blind or other such window blind assemblies. The ratio of window blinds to batteries can be variable and may be chosen according to particular circumstances.

Figure 9:
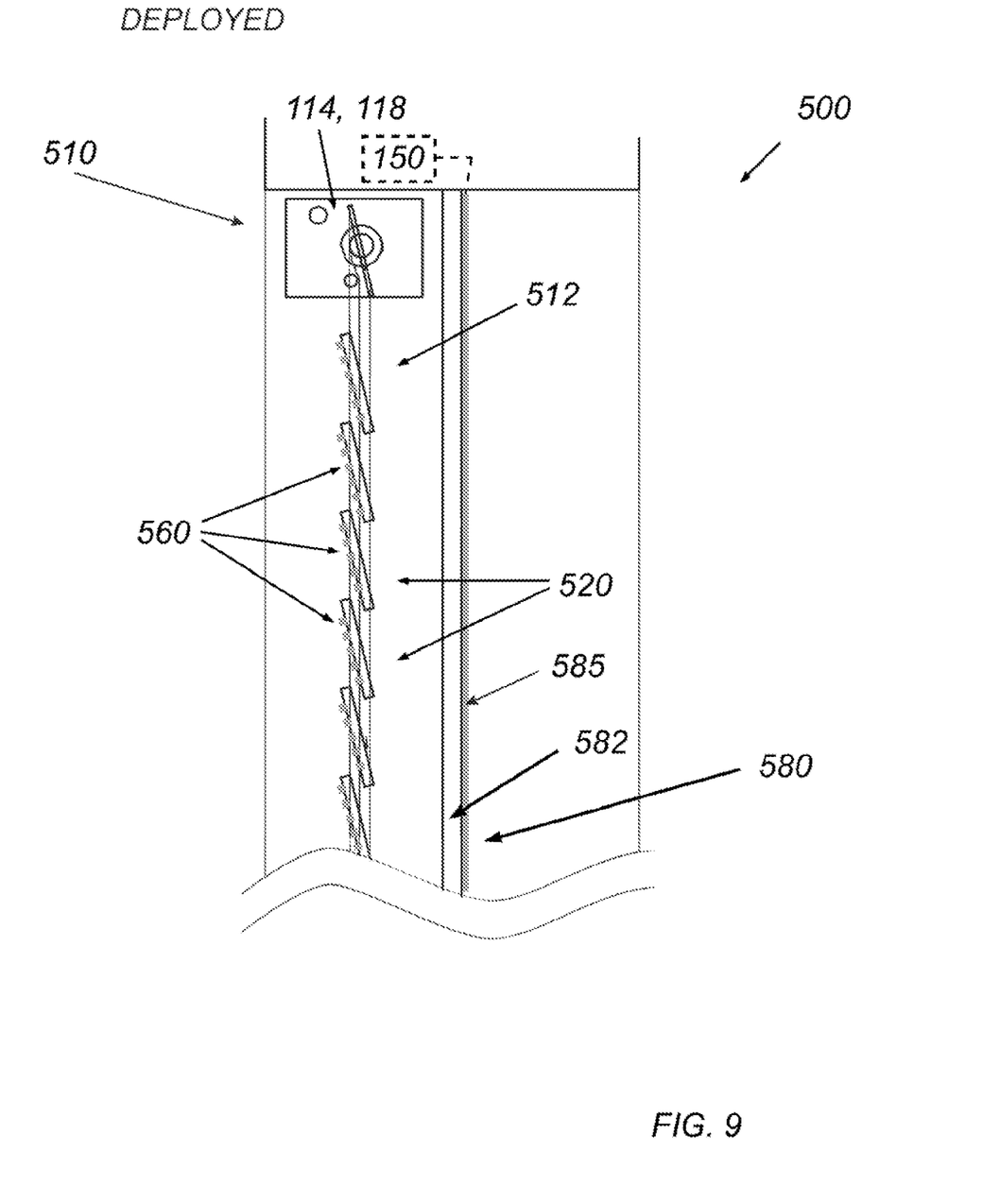
FIG. 9 is a schematic, side view illustration of a solar window blind system as located in a window according to yet another embodiment of the present technology, with the system being in a deployed configuration.

With reference to FIG. 9, a motor-operated window blind system 500, referred to as the system 600, powered by solar energy is illustrated. Elements of the system 500 that are similar to those of the system 100 retain the same reference numeral and will generally not be described again.

Recognizing that when a window blind is in its retracted configuration, the photovoltaic material thereon may not receive sufficient sunlight, a solution therefor is now described, which is labeled in FIG. 3 as system 500. This system 500 as described below includes a window that contains transparent photovoltaic material, which receives solar energy that is used to charge a battery. An example of a company that manufactures a transparent solar coating for windows is Ubiquitous Energy™, Inc. The battery powers lights disposed on the window blind. Advantageously, even when the blind is in the retracted configuration, the photovoltaic material of the window may continue to receive sunlight to charge the battery. The battery can then power the lights disposed on the blind when desired. As mentioned previously, the word "transparent" in the phrase transparent photovoltaic material does not mean that 100% of light passes therethrough. Rather, transparent is understood to mean substantially transparent, so that scenery is visible when looking through the transparent material, but at the same time, enough light is being absorbed by the material to permit the photovoltaic effect to occur.

The system 500 includes a window blind 510 disposed near a window 580. The window blind 510 includes a light blocking assembly 512 capable of assuming a deployed configuration to block external light entering through the window 580, and a retracted configuration to allow external light to enter through the window 580. The light blocking assembly 512 includes a plurality of rotatable slats 520 operatively connected to a motor 118 of the system 500. The deployed and retracted configurations are similar to those illustrated for the system 100 and will not be described further.

The system 500 includes light sources 560 disposed on the light blocking assembly 512. Specifically, the system 500 includes a plurality of LED strips 560, with one LED strip 560 disposed on each rotatable slat 520. Depending on the embodiment, more or fewer light sources 560 could be included in the system 500.

The system 500 further includes the motor 118 as mentioned above, the microcontroller 114 for controlling and operatively connected to the motor 118. The system 500 also includes the battery 150 for powering the light sources 560. In the present embodiment, the motor 118 is electrically connected to the battery 150 such that the battery 650 serves to power the motor 618 when in use. In some embodiments, it is contemplated that the battery 150 could only power the light sources 560 and the motor 118 could be powered by a power source external to the system 500.

According to this embodiment, the window 580 includes one or more transparent glass panes 582, with embodiments being similar to standard residential or commercial building windows. The window 580 also has a transparent photovoltaic material 585 disposed on the pane 582. While the material 585 is illustrated as being applied to an exterior side of the window 580, it is contemplated that the material 585 could additionally or alternatively be applied to an interior surface of the window 580. The battery 150 is electrically connected to the transparent photovoltaic material 585 of the window 580, wherein the photovoltaic material 585 is utilized to charge said battery 150.

In at least some embodiments, the motor 118 could be electrically connected to the transparent photovoltaic material 585 such the motor 118 is powered by utilizing the transparent photovoltaic material 585 when the system 500 in use.

In some embodiments, the system 500 as described above could be provided for use with the window 580, for instance for a window previously installed in a building having a photovoltaic material applied thereto. In some other embodiments, the system 500 could further include the window 580 and/or the photovoltaic material 585. For example, the system 500 could provide both the window blind 510 and the photovoltaic material 585 to be applied to a window of a building.

Generally speaking, the systems 100, 200, 300, 400, 500 as described above have elements of the light blocking assembly capable of moving, such as from the deployed configuration to the retracted configuration. In the case of a Venetian blind, the light blocking assembly (and in particular, the slats) is also capable of moving while in the deployed configuration by rotating, typically in unison. When the light sources reside on the slats, moving the slats affords the opportunity to move the lights in various ways. As the slat rotates, the lights thereon will be directed at various angles, providing an additional degree of freedom which can offer an extra convenience.

For at least some of the embodiments described above, the lights or light sources on the window blind, which can be static or dynamic, may be directed onto the ceiling to mimic natural light or to simulate a sunny day when it is cloudy, which may be beneficial to health. These lights can augment or supplant other conventional light sources in a room. Alternatively, the lights may be pointed to the floor of the room to eliminate glare that could arise if the lights were pointed at someone's eyes.

The light sources of at least some of the above described systems may be disposed on some part or most of the light blocking assembly, on the front and/or the back. For example, in the case of a Venetian blind, the light strips can appear on a variable fraction of the slats. In some embodiments, every slat will have a light strip thereon. In others, only every other slat, for instance, will have a light strip. The light strip can extend the full length of the slat or on just a portion of the slat. The light strip can be disposed on just one side of the slat or on both sides. In one example, the light strip can alternate from front to back on successive slats.

The systems 100, 200, 300, 400, 500 described herein have several possible useful applications and/or technical solutions to challenges in the art. These could include but are not limited to the following applications, which could be implemented by one or more of the above described systems 100, 200, 300, 400, 500. It is understood that some minor adjustments to the embodiments described above may be required.

- a nightlight: When coupled to a motion sensor, the system could detect when someone gets up from bed in the middle of the night and can turn on dim (low intensity) lights to help one see better.
- flickering lights for security: With the window blind system closed (deployed and blocking external light from entering) and no occupants in the house, the lights of the window blind assemblies could be made to flicker to simulate a television that is turned on. Such a system could aid in deterring thieves by intimating that there is a person in the room or building.
- plant light: With the window blind system closed (deployed and blocking external light from entering), plants nearby could obtain light from the light sources of the system.
- external security lights: Light sources of the system could be arranged to shine outward through the window 50 for use as security lights. In some cases, the lights could also be coupled to a motion detector. When a passerby triggers the motion sensor, the lights can turn on, thereby illuminating a region outdoors. Alternatively, the lights could be coupled to an alarm system. When someone sets the alarm system and leaves the house (as detected, for example, by the door closing), the system could automatically shut the window blind and the lights thereon could be turned on as a security light for inside or outside the room or building.
- external video wall: The light sources of the system disposed in one or more windows could be controlled to act as pixels to make a video display. For example, when lights that shine externally are present on blinds of an office building, the many lights can be used to create video images that can be seen from people on the street. The size of the video display could encompass many windows. Advertisements, safety messages, news, weather, or other useful data could be displayed on the blind systems. A controller could further control the lighting of the pixels to create an image. Moving the lights, such as by rotating the slats with lights thereon, would allow for additional effects.
- holiday lights: It is common practice, in residential or commercial buildings, to install decorative lighting, for instance during holiday seasons (e.g. Christmas lighting). Instead or in addition to dedicated decorative lighting, the light sources of the system could emit decorative lighting during this season. Advantageously, the need to install string or tree lights using ladders, which can be a laborious and dangerous task, may be obviated. Well-suited lights for this purpose are LIFX tiles or beams. One can synchronize the light displayed between windows of one house, or even between houses. Thus, a festive, coordinated light show can be produced on a block of neighbors' houses. For this purpose, one or more microcontrollers is operatively connected to the at least one light source. The microcontrollers in various houses could be connected via the internet or some local area network. The microcontrollers, which can be programmed, control at least one of the duration, color and intensity of the at least one light source.

Although embodiments have been described above with reference to the accompanying drawings, those of skill in the art will appreciate that variations and modifications may be made without departing from the scope thereof as defined by the appended claims. For example, it will be appreciated that the controller described herein can include various processors that are proximal or remote from each other.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A solar window blind system for a plurality of windows, the system comprising:
   a plurality of window blind assemblies, each window blind assembly being configured to variably block light passing through a corresponding one of the plurality of windows, and each window blind assembly including:
   a light blocking assembly,
   a motor operatively connected to the light blocking assembly for moving the light blocking assembly, and
   at least one light source;
   at least one photovoltaic component residing at at least one window blind assembly of the plurality of window blind assemblies; and
   at least one rechargeable battery electrically coupled to and charged by the at least one photovoltaic component, wherein the at least one rechargeable battery is electrically connected to and capable of powering the at least one light source of each of the plurality of window blind assemblies.

2. The system of claim 1, wherein each window blind assembly of the plurality of window blind assemblies further includes a microcontroller for controlling the motor.

3. The system of claim 1, wherein, for each window blind assembly:
   the light blocking assembly is capable of assuming a deployed configuration and a retracted configuration;
   the light blocking assembly blocks external light from entering the room when in the deployed configuration;
   allows external light to enter the room when in the retracted configuration; and
   the at least one light source is disposed on the at least one light blocking assembly.

4. A solar window blind system located at a window of a room, the system comprising:
   a window blind having a room portion that can face the room and an exterior portion that can face away from the room towards an exterior of the window;
   at least one motor operatively connected to the window blind for moving the window blind;
   at least one photovoltaic component disposed on the window blind;
   a rechargeable battery electrically connected to the at least one photovoltaic component and charged therewith;
   at least one light source electrically connected to the rechargeable battery, the at least one light source being disposed on at least one of the room portion to shine light into the room and the exterior portion to shine light into the exterior of the window, the at least one light source capable of being powered by the rechargeable battery when the at least one light source is in use;

a microcontroller operatively connected to the at least one light source, wherein the microcontroller controls at least one of a duration, a color, and an intensity of the at least one light source, and wherein the microcontroller is capable of turning on the at least one light source in response to a triggering event, said event being at least one of motion being detected and a security alarm being set; and a plurality of rotatable slats, each slat having a concave side and an opposite side, the concave side being adapted to receive sunlight at an incident angle after passing through the window, wherein:

the at least one photovoltaic component is disposed on the window blind on the opposite side of each slat;

at least one light source includes a series of light emitting diodes running along each slat, such that light emitted from the light emitting diodes can be directed in different directions depending on how much the slat on which the series runs along is rotated; and depending on the incident angle, a concave side of one slat can reflect the sunlight to the at least one photovoltaic component on an opposite side of an adjacent slat or can reflect light back out through the window.

5. A solar window blind system located near a window that separates an interior space of a room and an outdoor space, the system comprising:

a window blind that includes a slat having an interior-facing side that faces the room and an exterior-facing side that faces out the window towards the outdoor space;

a photovoltaic component disposed on the window blind;

a rechargeable battery electrically connected to the photovoltaic component and charged therewith;

at least one motor for moving the window blind, said motor being powered by the battery;

a light source disposed on the exterior-facing side of the slat that is capable of shining light through the window to the exterior space, said light source being powered by the rechargeable battery;

a plurality of rotatable slats, each slat having a concave side and an opposite side, the concave side being adapted to receive sunlight at an incident angle after passing through the window; and at least one photovoltaic cell disposed on the opposite side of each slat, the rechargeable battery electrically connected to the at least one photovoltaic cell and charged therewith, wherein, depending on the incident angle, the concave side can reflect the sunlight to the at least one photovoltaic component on the opposite side of an adjacent slat or can reflect light back out through the window.

* * * * *